(12) United States Patent
Blaeuer

(10) Patent No.: US 7,036,725 B2
(45) Date of Patent: *May 2, 2006

(54) SHOPPING CART HANDLE WITH BUILT-IN CONSOLE FOR THE INPUT AND DISPLAY OF CONSUMER PRODUCT INFORMATION

(75) Inventor: Dennis C. Blaeuer, Washington, DC (US)

(73) Assignee: Smart Media of Delaware, Inc., Winchester, VA (US)

( * ) Notice: Subject to any disclaimer, the term of this patent is extended or adjusted under 35 U.S.C. 154(b) by 146 days.

This patent is subject to a terminal disclaimer.

(21) Appl. No.: 10/304,000

(22) Filed: Nov. 26, 2002

(65) Prior Publication Data
US 2004/0262385 A1 Dec. 30, 2004

Related U.S. Application Data

(63) Continuation of application No. 08/639,940, filed on Apr. 16, 1996, now Pat. No. 6,484,939, which is a continuation-in-part of application No. 08/470,033, filed on Jun. 6, 1995, now abandoned.

(51) Int. Cl.
*G06K 15/00* (2006.01)

(52) U.S. Cl. ............. 235/383; 235/462.01; 235/462.13

(58) Field of Classification Search ........... 235/462.01, 235/462.13, 462.43, 383, 384, 385
See application file for complete search history.

(56) References Cited

U.S. PATENT DOCUMENTS

| | | | | |
|---|---|---|---|---|
| 4,868,544 A | * | 9/1989 | Havens | 340/568.5 |
| 5,250,789 A | * | 10/1993 | Johnsen | 705/14 |
| 5,543,607 A | * | 8/1996 | Watanabe et al. | 235/383 |
| 5,836,051 A | * | 11/1998 | Myers | 16/436 |
| 6,484,939 B1 | * | 11/2002 | Blaeuer | 235/383 |

* cited by examiner

*Primary Examiner*—Karl D. Frech

(57) ABSTRACT

A console for the input and display of consumer product information such as pricing, etc. The console may be built into the handle of the shopping cart or as a retrofit application on existing handles. The console has a product information input device for numerical values such as product pricing, cost per unit, etc. The apparatus has a calculator and output display for such data. Some space on the console will likely be dedicated to a display panel for advertising. The console may be equipped with a bar code scanner as an alternate means of inputting such consumer data. The console should have an output display, such as a monitor, and/or a readout in order to display the product information such as: cost per unit. A video monitor may be used in connection with the console in order to provide advertising information related to products.

1 Claim, 6 Drawing Sheets

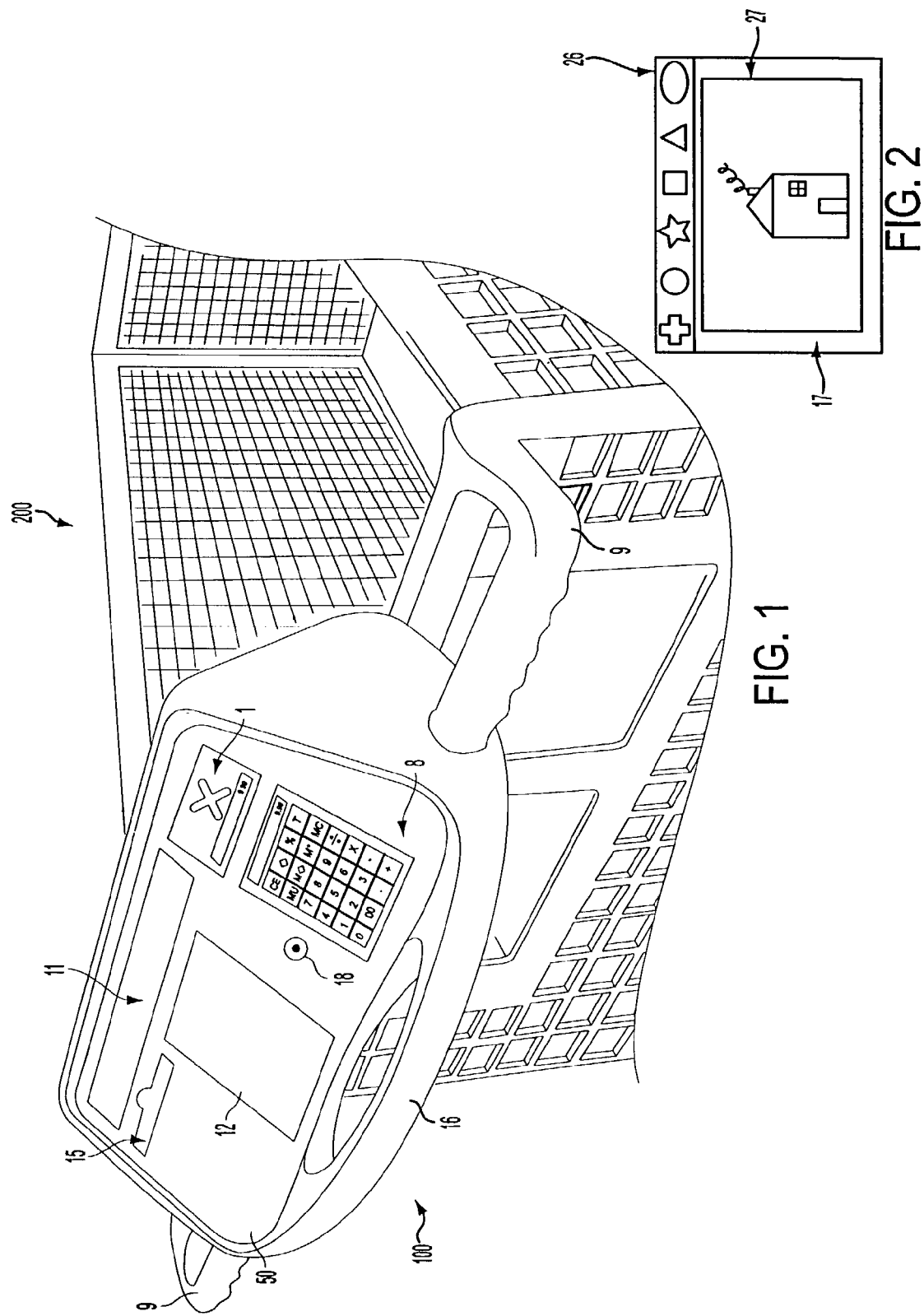

SHOPPING CART HANDLE WITH BUILT-IN CONSOLE FOR THE INPUT AND DISPLAY OF CONSUMER PRODUCT INFORMATION

This is a continuation of application Ser. No. 08/639,940, filed Apr. 16, 1996, now U.S. Pat. No. 6,484,939 which is a continuation-in-part of application Ser. No. 08/470,033, filed on Jun. 06, 1995, now ABN., the contents of both of which are hereby incorporated by reference.

BACKGROUND

The invention relates to the field of shopping carts and, in particular, to an improved shopping cart handle having an output and input means to input raw data concerning consumer items found on the market and an output display that displays that and related data. Such a apparatus and associated computer hardware will allow the consumer to input such information as price per unit volume, etc. into a computer and to retrieve refined data e.g. price per unit, etc. from a display associated with the computer.

It is thought that the use of a shopping cart so equipped with an information display monitor and a data input device will make it easier and more convenient for the shopper to process information related the goods at the store including: price per unit information for various types of goods. Placing a display monitor and associated data input devices on the handle of a shopping cart allows such devices to be in close proximity to the shopper's hands and at a point where the shopper's eyes will easily make contact with the display. The use of advertising space in connection with the display will be an added benefit to owners of stores and suppliers of consumer products.

While there are shopping carts that do receive radio frequency communications (U.S. Pat. No. 4,868,544 is the only one we are aware of) none of them have input devices that allow the shopper to input pricing information and obtain a readout that displays such data and refined data: such as price per unit, etc. Moreover, none of the prior art shows a shopping cart handle having a bar code scanner in order for the consumer to input price and unit information directly into a computer that is part of the handle console.

SUMMARY

The invention is a shopping cart console for the input and display of consumer product information such as pricing etc. The console may be built as the handle of the shopping cart or as a device to be retrofitted onto existing handles. The console should be so oriented on the handle that the consumer can readily view the displayed information from his or her position behind the cart. The console may have a keyboard means for the consumer to input product information e.g. pricing, etc. directly into a computer contained in the console. In addition to, or as alternate to, the keyboard the console may be equipped with a bar code scanner in order for the consumer to input such pricing information merely be sweeping the item in question over the bar code scanner which then inputs product data directly into the computer memory.

An output display should also be associated with the console in order to display the data that the consumer is inputting as well as the refined data such as cost per unit. Such an output display may be any state of the art means and may include for example: an LCD, LED or a video monitor. Such output may include advertising or sales announcement. Some space on the console may be dedicated to an advertising or display panel that promotes store products. Such a panel may be backlit for better viewing. A separate video monitor may also provide advertising information related to other products in the store. Such information may be sent to the console by means of a transmitter at some location, perhaps in the store or at a central location. Such broadcasted data would be received by a broadcast signal receiver located in the console. Such broadcast data may then be output on the video display in order to alert the shopper to specials, etc.

It is an object of the invention to provide a customer in a store with a readily available means for inputting product pricing information into a display monitor and to make pricing calculations such as price per unit, etc. and to have such information readily displayed to the shopper.

Another object of the invention is to equip a shopping cart with a display monitor and data input devices in order to allow a consumer to input and display product pricing information at a place where it is convenient to see such information on display.

Another object of the invention is to provide a means for displaying product information near the handle of a shopping cart in order to have such information for viewing by the consumer at a point where he/she is likely to see it without much trouble.

Another object is to provide a means for consumers to quickly display product information on a display monitor without having to input such information manually trough the use of a keyboard.

Another object of the invention is to provide a shopping cart having a handle with a means to display consumer data such as the accumulated costs or purchases, pricing for products, etc. and having a means for the consumer to conveniently input such data through the use of a bar code scanner associated with the cart.

Another object of the invention is to provide a shopper in a store with readily available product directory in order to make the shopping experience more pleasurable.

Another object of the invention is to provide food and retail companies with the ability to present advertising information to a shopper in a store in a manner that requires little effort on the part of the consumer.

Other objectives of the invention will become apparent to those skilled in the art once the invention has been shown and described.

DESCRIPTION OF THE DRAWINGS

FIG. 1 Overall view of one embodiment of the console and monitor.

FIG. 2 View of rear of console showing entertainment display.

DETAILED DESCRIPTION OF PREFERRED EMBODIMENTS

Figure 3:
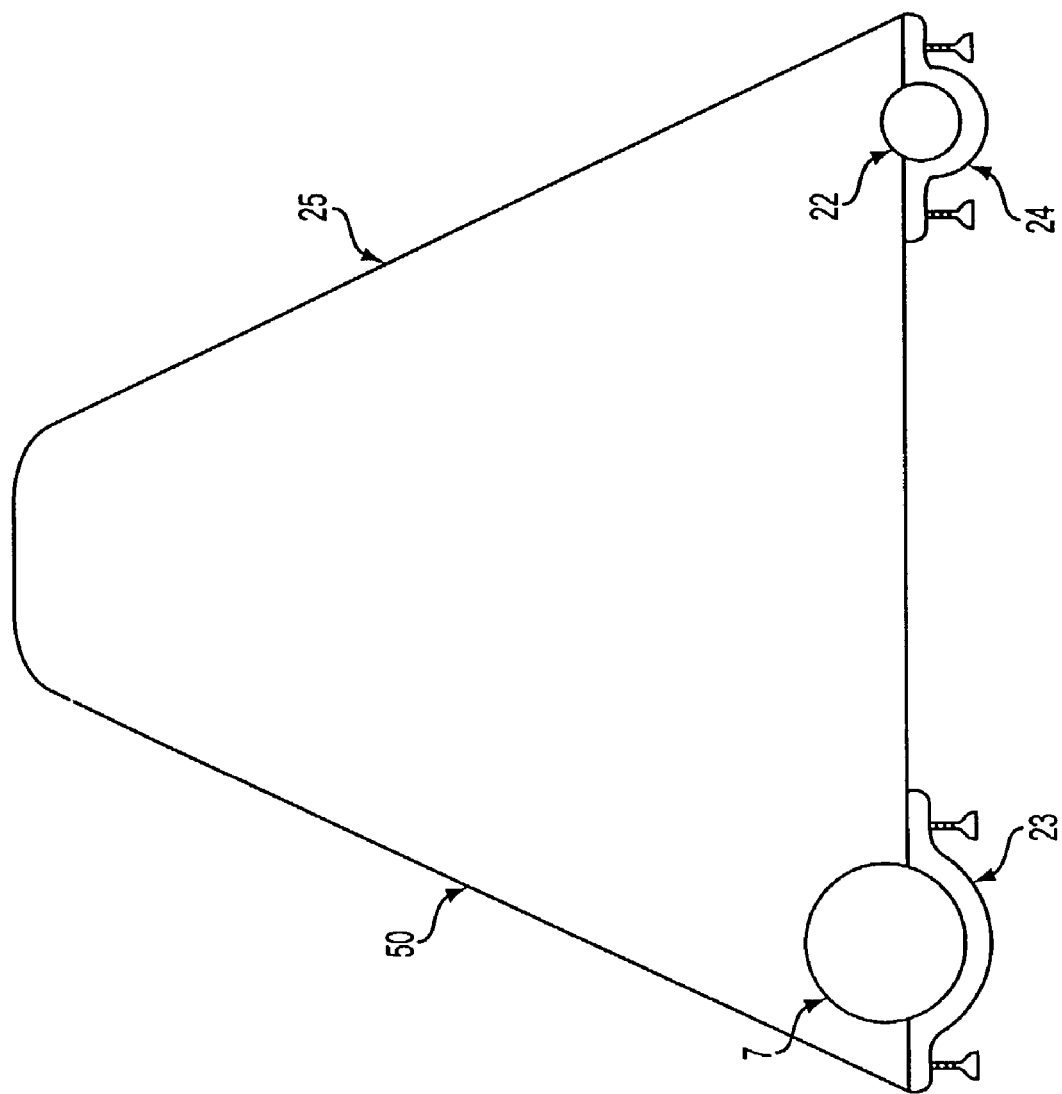
FIG. 3 Side view of console showing means to attach to existing handle.

Referring to FIG. 1, a shopping cart unit 100 for self scanning and self checking out by purchasers in a store and a process that uses such unit as described herein.

A shopping cart 200 having an integrated; self scanning and checking unit 100 is described herein. The unit 100 may be constructed as a one piece unit that may be made integral with the shopping cart handle. See FIG. 1. Such a unit 100 should contain a bar code scanner 1 and an output display device 2 so that product prices may be read from bar codes (usually found on product packages nowadays) by swiping the bar codes across the scanner 1. The display unit 2 would then report the information to the shopper by means of the display that may be a part of the unit 100. The unit 100 may include a means for totaling the prices of all the purchases that the consumer wishes to make and then provide a readout of the total on the display 2.

Figure 6:
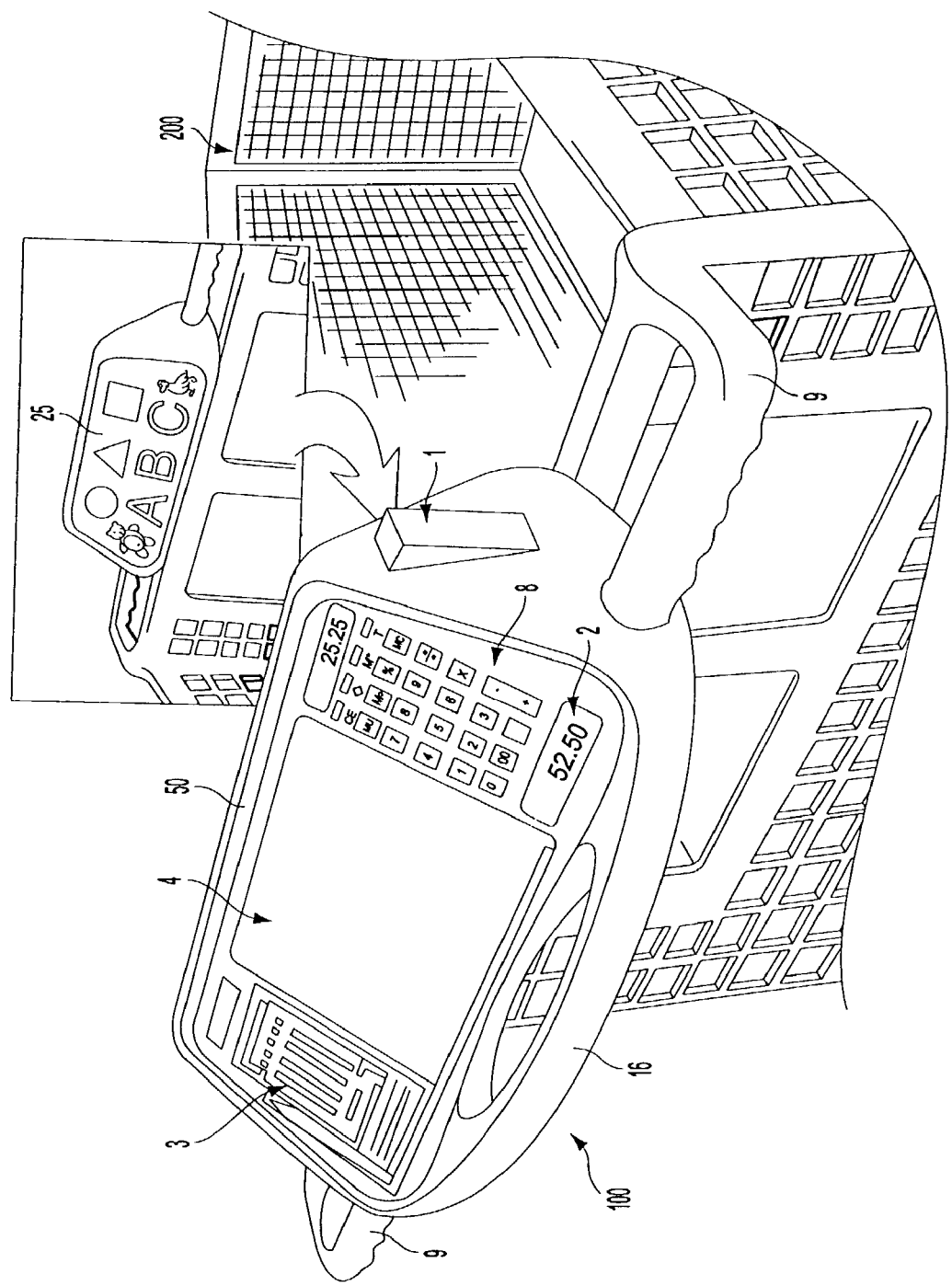
FIG. 6 Integrated self scanning unit and shopping cart handle.

Referring now to FIG. 6, unit 100 should also have a separate provision 3 for reading magnetic strip information (e.g. that contained on a debit card, a credit card, a bank ATM card or any such card having a readable strip) to enable the unit to thereby verify the identity of the user and may debit the cost of those goods from the consumer's account as he/she is checking out. This may include a slot or other type of reader in connection with the unit. The user could then insert or swipe his card across the reader and the unit would then identify the user's account and may be used to debit his account in order for the consumer to pay for his goods.

Such a unit would preferably have a Radio Frequency (RF) or infrared (IR) transmitter and receiver in order to communicate with other data bases and transmit to similar devices. Such other devices may, for example, be used by a centralized office that can report back price changes to the unit and update such prices on a continuous or almost continuous basis. Price information may be stored in a separate computer or other type of information storage unit that is used in connection with the self scanning unit. The computer may be a part of the unit itself. Such a transceiver may enhance the pricing process as prices and special sales items can be verified on a continuous, or nearly continuous, basis by virtue of a communications link with a remote location such as a central office. Prices may be updated in this manner. A shelf-based communicating device including: SHELF TALKER (a trade name) or known by the generic name of electronic shelf tags, may be used to transmit pricing information and pricing updates to the cart based self scanning console. Such communicating devices may based on RF, IR or other means.

Such a transmitter/receiver (transceiver) may also have a provision for debiting and/or verifying account information relating to the magnetic strip-based card and/or to the user's credit or bank account. In this manner, the shopper's account can be verified and/or debited by the unit during the check out process by virtue of the transmitter/receiver.

Referring to FIG. 6, there may be a large monitor or display 4 in connection with the unit may be for example: an LCD (liquid crystal display) or a monitor e.g. a television monitor, including color monitors. Large display 4 may function as an interchangeable advertising panel, and may alternately utilize light emitting diode (LED) technology. Other means for visual display may be used. This larger display 4 would be used for displaying advertising messages directed at the consumer. Such messages may be regularly changed or updated at intervals to correspond to new advertising campaigns. Such display may be used in connection with a centralized location that will transmit updated advertisements to, say, for example, all the shopping carts in the store. Such communications with the shopping cart monitor may be by means of radio frequency transmissions.

Referring to FIG. 1 and FIG. 6, a separate display 2 should be in connection with the bar code reader so that price information may be shown to the consumer and thus verified. The display 2 may also have means for indicating to the consumer that his account has been authorized for payment. Thus the monitor can be interactive as it can relate changes in store prices including sales items or advertisements as the monitor is used in connection with the information being relayed by the transceiver. In addition to the magnetic bar code reader 3, the cart may be equipped with a numerical information input means, such as a key pad, for inputting information into a computer in the display. Such numerical information may be displayed to the consumer through the monitor. The keypad device may be used to input information pertaining to the customer's bank account in order to access such account (via the transceiver described above) and make debits on such accounts as needed.

In addition, referring now to FIG. 6, the monitor 4 can provide readily updatable advertisements. These advertisements can be displayed on the monitor 4 for the consumer. Again the advertisements can be changed or updated on an almost continuous process by virtue of the RF transceiver which can provide new advertisements or modify existing advertisements. A computer in connection with the unit may generate such advertisements and the transceiver may simply change one part of the message (e.g. the price) in order to generate a new message on the monitor.

The unit 100 may be equipped with a printing unit, such as a thermal printer, that can print out a sales slip for the products purchased. The unit 100 may also have an electronic signature pad for consumer to sign for his goods. In addition, the unit 100 may produce printed coupons or advertisements at the time the product is scanned or at the point of sale. Such advertisements or coupons may be changed own or upgraded by means of the transceiver that can receive updated coupon information from a central unit and then pass on such information to a means in the unit 100 that has the means and can print out coupons, advertisements, etc. at the time of checking out.

By "self scanning" it is meant that the shopper will be able to scan his purchases through a bar code reader by himself to verify the price and may then check out of the store on his own. Store personnel may be decreased or eliminated by such a device. Thus, the process of totaling the goods purchased and the actual payment may be done by the unit 100 and so the user can essentially total the cost of goods, bag the goods and then pay for his goods prior to the consumer leaving the store. The cart 200 described herein is believed to facilitate both of these processes by means of the bar code scanner 1 and the magnetic card reader 3 and authorization process.

The shopping cart unit 100 can generate pricing information based upon the bar codes found on most store items. In addition, the cart based unit 100 will update pricing information by means of for example, a radio frequency transmitter/receiver. The unit 100 may also authorize purchases from the consumer's magnetic strip card by virtue of the same transmitter/receiver.

Figure 7:
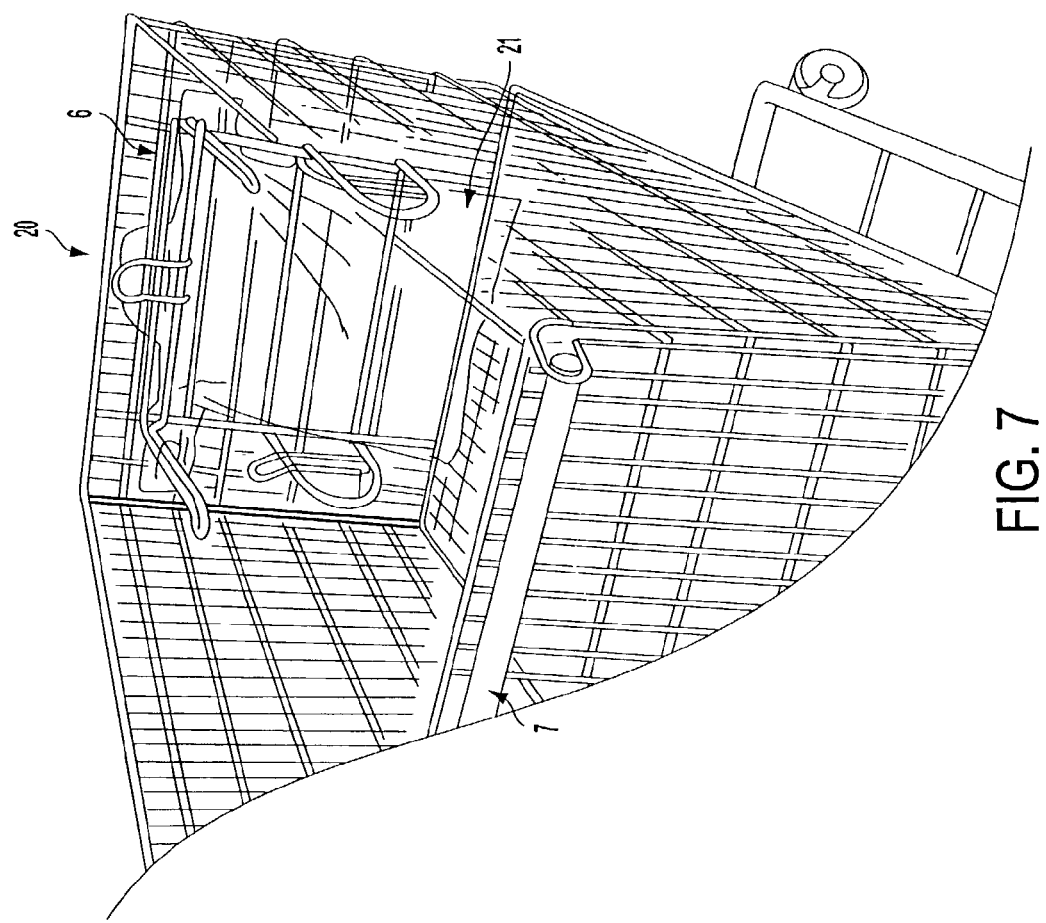
FIG. 7 A grocery bag support that may be attached to the cart.

Referring now to FIG. 7, in addition, the shopping cart 200 may be equipped with a bag support 6 that may be located inside of and at the front 20 of the cart. Such a support 6 may be constructed of metal and should be able to hold a plurality of state of the art shopping bags 21, those that are normally used during the check out process. The user can then use the bags 21 contained in the cart to facilitate the self scanning process and self check out process depending on the type of operation that the retailer chooses to employ.

Figure 5:
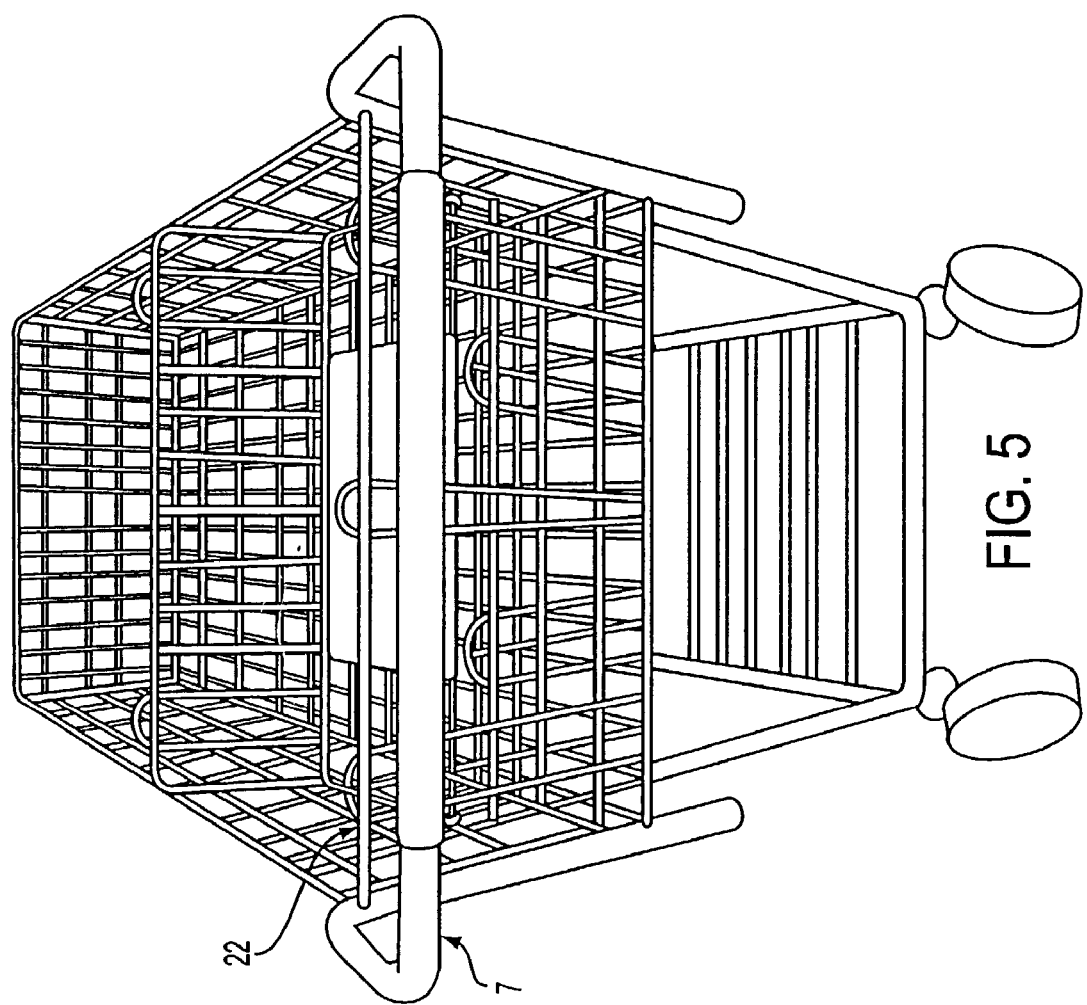
FIG. 5 State of the art shopping cart.

The overall construction of the display console 100 is as shown in FIG. 1. The display console 100 may be constructed as a one piece unit that takes the place of the shopping cart handle for a shopping cart 200. Alternately, the console 100 can be constructed in order to be retrofitted onto existing shopping cart handles. Such console units 100 could have a molded section at the rear and may be shaped so that they can be attached around an existing handle. Typical shopping carts nowadays, have a handle 7 at the rear and behind the basket for the pushing and guiding the cart (see FIG. 5). The existing handle 7 would then support the console 100 at the rear of the cart. Referring to FIG. 5, typical shopping carts also have a cart cross bar 22 which may be used in conjunction with handle 7 to support console 100. As shown in FIG. 3, this attachment would be accomplished with screw-on braces 23 and 24. In either case, it is thought likely that the console 100 will be constructed of molded parts with a two part construction likely. Such a two part construction may be e.g. separate halves that are joined to one another when placed over, or taking the place of, the handle 7.

Referring now to FIG. 1 and FIG. 6, the front of the console 100 should have a display face 50 that faces toward the rear (user's side) of the shopping cart 200 in order for a consumer, who is pushing the cart, to readily see data as it is being displayed. The readout device 2 would display numerical values e.g. price, cost per unit, brand name, etc. related to consumer items.

The display face 50 of the console 100 should be equipped with a numerical inputting means 8, such as a keyboard; a calculating device; and an output, or a readout that could display such values that are input to the calculator and subsequently derived. The calculator should have functions such as divide, multiply, add and subtract. The display face 50 of the console will be oriented toward the consumer in order for him/her to readily input numerical data relating to products into the calculator, or computer, stored inside the console.

There should be extended portions 9 at each side of the console in order to function as a handle or a hand grip. Such a hand grip may have raised portions that create troughs in the handle that can enhance the grip of the fingers.

The console 100 may be made of any state of the art materials that are relatively sturdy and inexpensive. Materials such as polypropylene and other polymeric materials are some such materials that come readily to mind. The console 100 should be of molded shape in order to provide a smooth feel for the consumer. It is preferred that the console 100 be wider at the base than at the top. It is preferred that the depth of the console be about 1–2" at the top and about 3–4" at the base of the console. It is preferred that the width of the console be about 14", more or less, and the height be about 8", more or less.

Referring now to FIG. 1, it is preferred that a computer be contained inside the console in order for such product information to be readily stored for display upon the output means 11 of the console 100. The computer may also be useful in performing operations upon the raw data, such as unit price, and unit size; in order to convert such information into refined data such as cost per unit volume or cost per unit weight, etc. Such refined data may also be displayed on the output means 11.

A simple output display 11 may be merely a readout display e.g. that found on pocket calculators. Such a readout display 11 may use e.g. Liquid Crystal Diodes (LCDS) or Light Emitting Diodes (LEDs) in order to present the information in lighted format in the readout as an electronic window. Information displayed on display 11 may be programmed by the store to provide a store/advertiser message board. Any other state of the art means for displaying this information may also be used without varying from the spirit of the invention.

Additional information could be supplied to the readout display 11 by e.g. an infra red signal sent out by a transmitter in connection with a product display in an aisle. Such a transmitter would send out a signal to a corresponding receiver in the console as the cart goes by the display. The signal would then be converted into product information that could be displayed on the readout display 11.

There may be a portion of the face 50 of the console 100 dedicated to an advertising display 12 shown in FIG. 1. Such a display 12 may be merely a space, or window, such as a polycarbon window, in the console 100 that is large enough to support a preprinted sign that can provide an advertisement or e.g. a directory of products in the store. If preprinted signage is used, such advertising information could be printed directly on e.g. a plastic sign and then placed in the window. The sign would, preferably, be made of flexible materials, such as polypropylene.

The sign may be held in the display window through friction or other means. Back lighting may be employed behind the sign in order to illuminate the information on the sign. A bank of lights may be supported in the rear of the sign and inside the console 100 for such purpose.

The advertising display 12 may have LCDS, LEDs, or similar output devices in order to have an output that can be continually changed or updated for such information as: pricing, sales announcements, advertisements, etc.

There may also be a separate section of the console set aside for a store directory or index card that would display information relating to the location of different items in the store. It may be held in the same or similar manner as the advertising display 12.

Referring now to FIG. 6, in addition to, or in lieu of, the advertising display 12, a monitor 4(for example: a television monitor) could be used to display information relating to products in the store. There could be an in-store transmitter or a central transmitter that can send television signals to a receiver located in the console 100 and for display on the monitor 4.

The console 100 may be equipped with a key board 8 in order for the consumer to manually input pricing data, etc. into the computer contained in the console 100. Such a keyboard 8 should have the usual function keys e.g. multiply, add, subtract, divide, etc. and buttons corresponding to numerical designations e.g. 0, 1, 2, 3, etc. Such a key board 8 may also come with a function key that could for example, provide price per unit, or price per volume information which would be helpful to consumers during their shopping.

The console 100 may, in addition or in lieu of the calculator, be equipped with a bar code scanner 1 in order for the user to input data regarding e.g. price, type of good, brand name, etc. directly into the memory of the computer in the console 100. The bar code scanner 1 may be used in addition to the manual keyboard 8 or may take the place of such a keyboard 8 as the sole means of inputting such data. Such a bar code scanner 1 would be useful to a consumer who is pushing the cart 200 and spare him/her the time and trouble of having to input such data manually into the computer through the keyboard 8. There may be an output display 2 associated with the scanner that would then output such information as for example: price information or a running total of accumulated purchases.

Typically, such bar code scanners have a data base in close communication with the input in order to read the bar code, obtain the pricing information regarding that code from a data base and then outputting such information. The data base may be updated on a periodic basis so that the scanner 1 will have the latest prices. Such updating may be by a manual means or by an automatic updating function. Such an automatic updating could be e.g. an infra red or radio communications link from the data base in the scanner to a centralized source of such updated information. Alternately, the bar code scanner 1 may operate without its own data base and may simply relay bar code information to a central source and then the central source relays such information back to the output of the scanner 1. Such a relay could be by e.g. radio or infra red communications. The bar code scanner 1 used herein may use either of these methods.

The calculator 8 may be equipped with any state of the art means available for powering such a calculator. Such means include solar powered units that may be able to receive light. Such solar cells may be equipped to receive different types of electromagnetic radiation including incandescent, fluorescent as well as solar lighting. Solar units would preferably be mounted on the top of the console. Other means, such as batteries, for powering the calculator 8 are possible.

Figure 4:
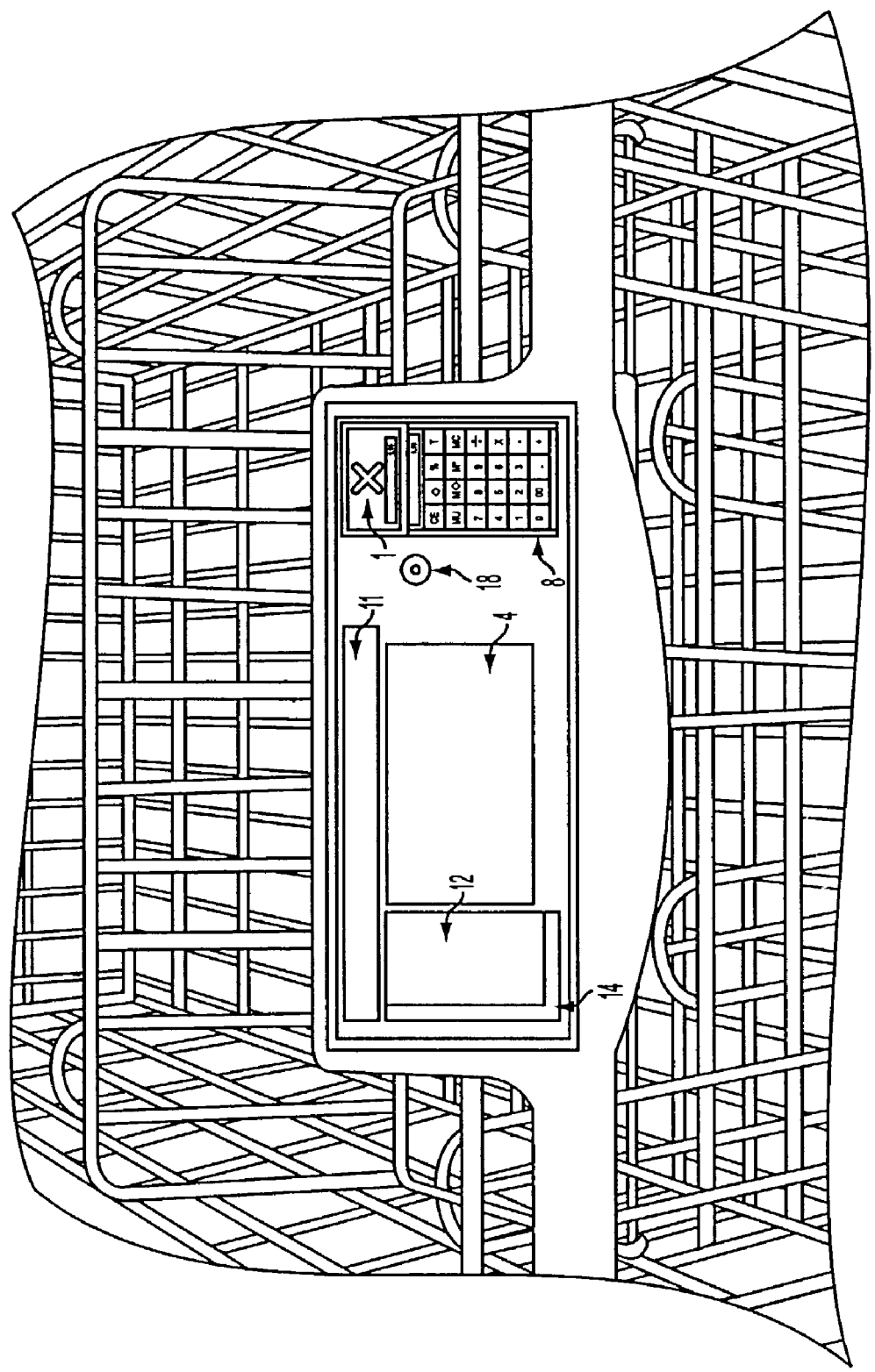
FIG. 4 Detail of console face.

For additional convenience, the console 100 may be equipped with a pencil and note holder 14 (FIG. 4). Such a holder 14 could be molded into the console 100 and would provide a space to store such pencils and/or paper. Alternately, a clip 15 (FIG. 1) could be used on the console face 50 in order to hold such pencils and notes.

The cart 200 may be equipped with homing means or a security alarm means. By "homing means" it is meant a device that can send out a signal when such a cart 200 leaves the immediate area of the shopping center. Such homing means should provide a signal to let store personnel, police, etc. identify the location of such a cart 200 that has left the shopping area. Any state of the art homing devices may suffice for this function. A security alarm means would be similar and would send out a signal to security personnel when it determines that the cart 200 has left some predetermined area, e.g. the confines of the store.

An additional handle 16 may be placed at the front of the console 100 and extend back toward the user, see FIG. 1. Such handle 16 may facilitate the pushing of the cart 200 from the center which may be useful if one only has one hand to push, such as an older person, or one who is reaching with the other hand.

Other features may be added to the console 100 without varying from the spirit of the invention. Referring now to FIG. 2, FIG. 3 and FIG. 6, such features may include e.g. a toy or entertainment device 17 on the rear surface or child's toy side 25 of the console in order to entertain a child placed in the shopping cart seat. Such a device could be interactive in that the child could push buttons on the device that then produce audible or visual stimulation. Examples include shaped buttons that light up when pushed 26 and an electronic drawing board 27. Referring to FIG. 1 and FIG. 4, an earphone jack 18 could also be added to the console 100 in order for the consumer to plug into the earphone and hear the same product information on the display 11 by an audible means. Such information could include pricing as well as advertisements for particular brands and products.

The invention claimed is:

1. A self-scanning shopping cart for pricing and check out comprising:

A shopping cart apparatus in conjunction with the shopping cart, said apparatus having a bar code reader for reading bar codes associated with products and a personal information input device for accepting information used to identify the user of the shopping cart, said shopping cart apparatus having a transceiver for electromagnetic transmissions and for updating pricing information in response to said electromagnetic transmissions, said cart having a display means for displaying product information, wherein said personal information input device allows a user of the shopping cart to pay for at least one item purchased at the shopping cart from any location within a store and without interacting with checkout personnel, and wherein said display means comprises a front portion for displaying the product information and a back portion comprising a child's toy.

* * * * *